(12) United States Patent  (10) Patent No.: US 7,731,126 B2
Hoffjann et al.  (45) Date of Patent: Jun. 8, 2010

(54) AUTONOMOUS PASSENGER SEAT

(75) Inventors: Claus Hoffjann, Hamburg (DE); Hansgeorg Schuldzig, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 62 days.

(21) Appl. No.: 11/743,190

(22) Filed: May 2, 2007

(65) Prior Publication Data

US 2008/0149770 A1 Jun. 26, 2008

Related U.S. Application Data

(60) Provisional application No. 60/746,184, filed on May 2, 2006.

(30) Foreign Application Priority Data

May 2, 2006 (DE) .................... 10 2006 020 146

(51) Int. Cl.
B64D 11/00 (2006.01)
(52) U.S. Cl. ............. 244/118.5; 244/118.6; 244/122 R; 297/180.1; 297/217.1; 238/264; 105/345
(58) Field of Classification Search ............. 244/118.5, 244/118.6, 122 R; 297/217.1, 180.1, 217.3, 297/232; 238/264; 105/345
See application file for complete search history.

(56) References Cited

U.S. PATENT DOCUMENTS

| 5,090,770 | A |  | 2/1992 | Heinrichs et al. |
| 5,944,284 | A |  | 8/1999 | Bardel |
| 6,092,375 | A | * | 7/2000 | Denniston ...................... 62/94 |
| 6,921,987 | B2 | * | 7/2005 | Marin-Martinod ........... 307/32 |
| 7,195,282 | B2 | * | 3/2007 | Mizuno ...................... 280/830 |
| 7,240,492 | B2 | * | 7/2007 | Johnson ...................... 60/649 |
| 7,393,053 | B2 | * | 7/2008 | Kurrasch et al. ......... 297/217.3 |
| 2007/0062115 | A1 | * | 3/2007 | Berry et al. .................... 48/61 |

FOREIGN PATENT DOCUMENTS

DE 19902051 A1 8/2000
DE 10107420 A1 9/2002

* cited by examiner

*Primary Examiner*—J. Woodrow Eldred
(74) *Attorney, Agent, or Firm*—Christopher Paradies; Fowler White Boggs P.A.

(57) ABSTRACT

A passenger seat has autonomous electric power generated by a fuel cell system and humidification provided by the fuel cell system. The fuel cell system may include replaceable fuel cartridges and may power electronics such as in flight entertainment, lighting, comfort features, seat adjustments, communications and other features autonomously or under control of the seat occupant.

13 Claims, 1 Drawing Sheet

AUTONOMOUS PASSENGER SEAT

REFERENCE TO RELATED APPLICATIONS

This application claims the benefit of the filing date of German Patent Application No. 10 2006 020 146.9 filed May 2, 2006 and of U.S. Provisional Patent Application No. 60/746,184 filed May 2, 2006, the disclosures of which are hereby incorporated herein by reference.

FIELD OF THE INVENTION

The field relates to a seat device, in particular, an autonomous passenger seat for use in aircraft.

BACKGROUND OF THE INVENTION

In modern passenger transport means such as aircraft, passenger seats have additional comfort functions besides their primary function as a seat or a sleeper.

There are passenger seats having capabilities for massage, installed entertainment and communication electronics (IFE in flight entertainment). Adjustment functions may be performed electronically, allowing backrest, seating surface, headrest, leg support, and other adjustments to be adjusted via actuators which are integral components of the seat.

For performing these functions, the seats need an energy supply and, in particular, in seats with an installed IFE function, additional connections to communication and data lines. In aircraft, in particular, the high number of such connections restricts the flexibility of cabin design.

There is a longstanding and unresolved need to provide an autonomous passenger seat, which does not need external power or communication connections, and which may be positioned without any constraints in a seating arrangement, such as an aircraft cabin.

SUMMARY OF THE INVENTION

A seat device includes a seating unit and a fuel cell integrated in the seating unit coupled to provide electrical power to devices and actuators needing power.

A supply of humidified air may be provided by discharge of the fuel cell to the environment of the seat unit.

According to one example, the fuel cell supplies electrical energy.

A seat device may include a supply device with an exchangeable cartridge for supplying the fuel cell system with fuel, such as hydrogen.

The seat device may include a cooling device, which utilizes expansion of the fuel flowing from the cartridge into the fuel cell for cooling a container by expansion cooling. For example, drinks may be cooled in such a cooling device.

The seat device may include a lighting device or device which may be supplied with electrical power by the fuel cell system.

The seat device may include an electric control system for controlling at least one seat function. The control system may be provided with electricity by the fuel cell system. The seat function may provide for adjusting the backrest, the seat surface, the armrest, the footrest, as well as several other comfort functions, such as massage or seat heating.

According to another example, the seat device may include energy storage for storing the energy generated by the fuel cell system.

In one example, a single fuel cell system may supply a plurality of seat devices.

Excess energy generated by the fuel cell system may be fed into a separate power grid such as an onboard power grid of an aircraft.

A fuel cell system, which is integrated with a seat device or devices may be sized to provide power to take over the described supply function for the seat unit, and to be installed into the seat device or devices. The supply via replaceable cartridges is provided such that a cartridge or cartridges are sufficient to supply power during a complete flight mission. For example, the cartridges may be of a metal hydride storage type or a compressed gas cylinder type.

An example is subsequently described with reference to the appended drawing.

BRIEF DESCRIPTION OF THE FIGURES

The example described and the drawing rendered are illustrative and are not to be read as limiting the scope of the invention as it is defined by the appended claims.

DETAILED DESCRIPTION

Figure 1:
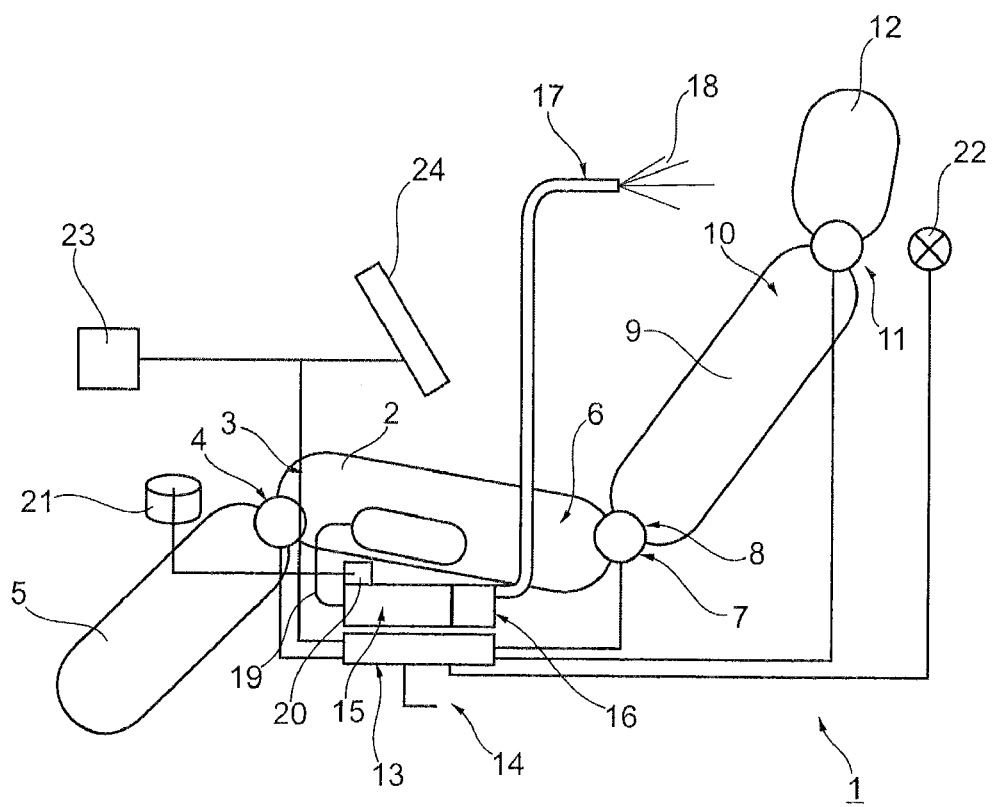
FIG. 1 shows an example of a schematic side view of a seat device 1.

The seat device 1 of this example includes a sitting surface 2, which is connected to a leg rest 5 with its one rim area 3 via a seat control element 4. With its other rim area 6, the seat surface 2 is connected with an end 8 of a backrest 9 via an additional seat control element 7. The other end 10 of the backrest 9 is connected via an additional seat control element 11 with a headrest 12. The individual seat control elements 4, 7, 11 are controlled via a control unit 13, which is disposed below the sitting surface 2 of the seat device 1. Via a remote control unit (not shown), which may be connected to the line 14 of the control unit 13, for example, a passenger may control the control unit 13, and thereby operate the individual seat control elements 4, 7, and 11 as desired, in order to adjust the sitting surface 2, the leg rest 5, the backrest 9, or the headrest 12, according to passenger requirements.

FIG. 1 furthermore shows a fuel cell system 15, which is disposed below the sitting surface 2 of the seat device 1.

As shown in FIG. 1, an air humidifier 16 is connected to the fuel cell system 15. An air humidifier 16 may deliver humidified air 18 via a conduit 17 into the area of the headrest 12. The humidified air 18, may be discharge air from the fuel cell system 15, for example.

In order for the fuel cell system 15 to produce humidified air, it may need to be connected to an electrical load. In one example, the load is a lighting system, such as a sleep lighting system or an artificial power consumer of some type.

A cartridge 18 supplies the fuel cell system 15 with fuel, such as hydrogen, via a supply line 19. The cartridge 18 is integrated into the sitting surface 2 of the seat device 1. Alternatively, the cartridge 18 may be disposed outside of the seat device 1, or may be integrated in a footrest 5 or a backrest 9.

As shown in FIG. 1, the seat device 1 further includes a cooling device 20, which is preferably disposed in the vicinity of the cartridge 18, in order to use the expansion cooling generated by the fuel flowing from the cartridge 18 into the fuel cell system 15 for cooling a container 21. The container 21, may hold beverages for a passenger using the seat device 1, for example.

The seat device 1 further includes a lighting device 22, located close to the head area of a passenger sitting on the seat device 1, such as by the headrest 12 and controlled via the control unit 13. Via a remote control unit or via a switch (not shown) disposed on the seat device 1, the control unit 13 may be operated to switch on the lighting device 22, switch it off or dim it. The lighting device 22 may be disposed or connected at any location on the seat device 1.

FIG. 1 shows that the seat device 1 includes an energy storage unit 23, storing the energy generated by the fuel cell system.

FIG. 1 furthermore shows in flight entertainment (IFE) and communication electronics 24, which are positioned above the sitting surface 2, so that a passenger sitting on the seat device 1, may operate the IFE easily.

Though not shown in the FIGURE, the seat device 1 includes suitably formed mounting devices for mounting the seat on the floor, or in specially provided seat rails.

Although the seat device 1 has been described in the above with reference to one example, alternative changes and modifications may be performed without departing from its intended scope.

A low temperature fuel cell type PEMFC (proton exchange membrane fuel cell) may supply electrical power, as one example of a fuel cell.

Furthermore, the above described functions may include an emergency oxygen supply for the passenger or an additional oxygen supply for increasing the partial oxygen pressure close to the breathing orifices of the passenger.

Furthermore, a single fuel cell system 15 may supply power to combinations of a plurality of seats, such as, an entire seat row (three to five seats) using one or more replaceable cartridges.

Alternative combinations and variations of the examples provided will become apparent based on this disclosure. It is not possible to provide specific examples for all of the many possible combinations ans variations of the embodiments described, but such combinations and variations may be claims that eventually issue.

What is claimed is:

1. A seat device comprises:
    a seat unit; and
    a fuel cell system integrated in the seat unit and providing electrical power;
and a conduit, wherein the fuel cell system provides humidified discharge air from the fuel cell, through the conduit, to an area of the seat unit adjacent to a headrest of the seat unit, wherein the humidified air includes discharge air delivered through the conduit directly from the fuel cell system.

2. The seat device according to claim 1, wherein the electrical power is supplied to the seat unit by the fuel cell system.

3. The seat device according to claim 1, further comprising an exchangeable cartridge for supplying the fuel cell system with fuel.

4. The seat device according to claim 3, further comprising a cooling device using an expansion cooling generated by the fuel flowing from the exchangeable cartridge into the fuel cell system for cooling a container.

5. The seat device according to claim 1, further comprising at least one lighting device supplied with energy by the fuel cell system.

6. The seat device according to claim 1, further comprising an electrical control system for controlling at least one seat function, wherein the electrical control system is supplied with energy by the fuel cell system.

7. The seat device according to claim 6, wherein the at least one seat function includes a comfort function.

8. The seat device according to claim 1, further comprising an energy storage unit storing electrical energy generated by the fuel cell system.

9. The seat device according to claim 1, further comprising electrical coupling to other seats, wherein the fuel cell system supplies electrical power to a plurality of seats.

10. The seat device according to claim 1, wherein energy generated by the fuel cell system is fed into a power grid.

11. The seat device of claim 7, wherein the comfort function is massage.

12. An aircraft cabin comprising the seat device of claim 1.

13. An aircraft comprising the aircraft cabin of claim 12.

* * * * *